Jan. 20, 1959     C. C. WHITEHEAD     2,870,393
THERMIONIC SERVO-AMPLIFIER SYSTEMS
Filed July 6, 1954

INVENTOR.
CYRIL C. WHITEHEAD
BY
Raymond A. Junkins
ATTORNEY

พ.tented Jan. 20, 1959

2,870,393

THERMIONIC SERVO-AMPLIFIER SYSTEMS

Cyril Cryer Whitehead, Kidbrooke, London, England, assignor to Bailey Meter Company, Cleveland, Ohio, a corporation of Delaware Application July 6, 1954, Serial No. 441,316

Claims priority, application Great Britain July 8, 1953

4 Claims. (Cl. 318—29)

This invention relates to thermionic servo-amplifier systems of the kind in which a carrier alternating current applied to a comparator or error detector is modulated in accordance with the difference between a control quantity and a comparison quantity representative of a position or state varied by a controlled servo-motor. Such systems may be used for measuring, indicating, or recording a control state or condition.

Such systems include a stage or usually stages of amplification by thermionic valves so that although the variations of the control quantity over the range of operation may be quite small, large control effects may be transferred to a motor. Large amplification or gain, lowers the relative effect of the mechanical resistances to motion of the motor and its associated moving parts, so that the motor is more ready to follow very small changes in the control quantity, in orther words the system is more sensitive. However, it is found that if the amplification gain is made too great, the systems, when disturbed, or spontaneously, will fall into a state of hunting in which it performs sustained oscillations at a frequency depending upon the constants of the system, the motor rotating first to one side and then to the other side of the equilibrium position appropriate to the prevailing control state or condition.

In order to combat such instability, it has been proposed to pass the modulated carrier alternating current from the comparator or error detector through special electrical networks (derivative or phase-advancing networks), designed to have transmission characteristics so varying with frequency that the control effect transferred to the motor is the sum of a part depending upon the error and a part depending upon the rate of increase of error with time. It is found that under these circumstances the gain, and so the sensitivity of the system, may be raised to a greater degree before the danger of instability occurs.

The provision of such separate networks entails appreciable complication and expense and the object of the invention is to provide simpler means for combatting instability.

The present invention comprises a thermionic servo-amplifier system of the kind in which a carrier alternating current applied to a comparator or error detector is modulated in accordance with the difference between a control quantity and a comparison quantity representative of a position or state varied by a controlled servo-motor, wherein the amplifier includes a feedback connection or circuit having a frequency characteristic such that the amplifier has a frequency-gain characteristic curve dipping to a minimum at or substantially at the carrier frequency.

The invention will now be described, by way of example, with reference to the accompanying diagrammatic drawings, in which.

Figure 1:
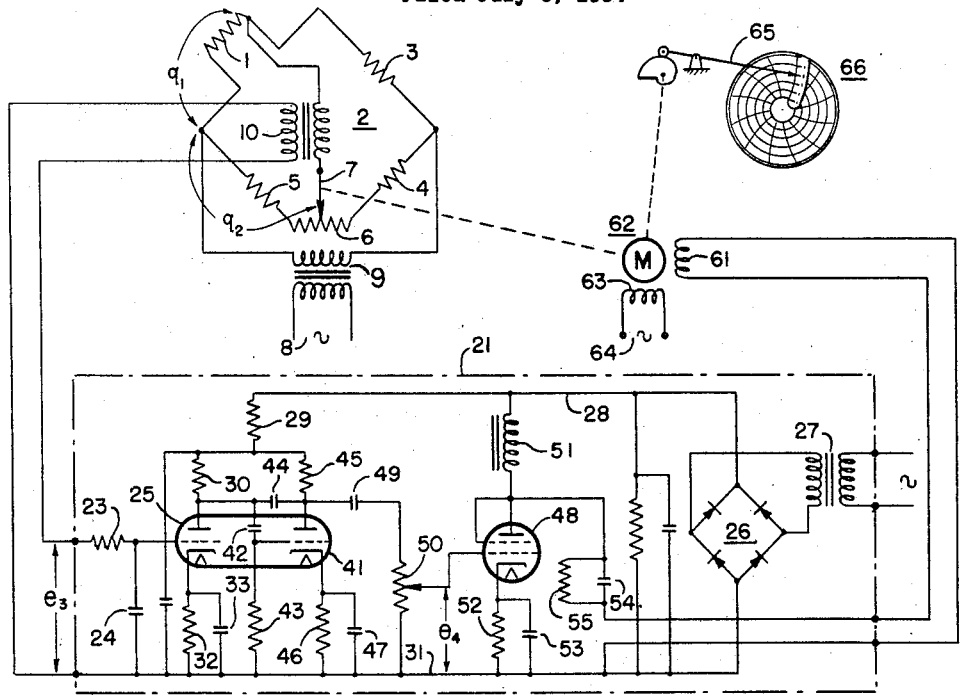
Figure 1 shows a system for measuring, indicating and recording a temperature.

Referring to Figure 1 of the drawings, a resistance 1 subjected to a temperature to be measured, indicated, and recorded, comprises one arm of a Wheatstone bridge 2, and an adjacent arm of the bridge comprises a fixed resistance 3. The arm opposite to that of the resistance 1 includes a fixed resistance 4, and the arm opposite to that of the resistance 3 includes a fixed resistance 5, and between the resistances 4 and 5 the bridge includes a potentiometer resistance 6 over which there can slide a movable contact arm 7.

The value of the resistance 1 constitutes a control quantity $q_1$ and the value of the resistance 5 together with the adjacent part of the potentiometer resistance 6 constitutes a comparison quantity $q_2$ with which the control quantity $q_1$ can be compared in the Wheatstone bridge by comparing the potential of the junction point between the resistances 1 and 3 with the potential of the contact arm 7, when the bridge is electrically energized. The arrangement is such that over the operative range of temperatures to which the resistance 1 is subjected, and correspondingly over the operative range of values of the resistance 1, the contact arm 7 can be moved along the potentiometer resistance so as to equalise the quantities $q_1$, $q_2$.

The difference between the quantities $q_1$, $q_2$ is arranged to modulate a carrier frequency, by energizing the bridge with an A. C. supply 8, of which the frequency will be denoted by $f_s$, applied through a transformer 9, and by detecting the alternating potential difference between the contact arm 7 and the junction point of the resistances 1 and 3. The contact arm 7 and the junction between the resistances 1 and 3 are connected together through the primary winding of a transformer 10, in the secondary winding of which the alternating voltage output $e_3$ is produced.

The output $e_3$ of the transformer 10 is an alternating voltage of the supply frequency $f_s$ and of amplitude which is greater or smaller the greater or smaller the difference between the quantities $q_1$ and $q_2$, being zero when $q_1=q_2$. The phase of the output $e_3$ is changed by 180° if the difference between $q_1$ and $q_2$ is reversed in sign.

The output $e_3$ of the transformer 10 is applied as input to an emplifier and motor control unit 21. In the unit 21 the input passes through a noise filter network, consisting of a series resistance 23 succeeded by a shunt condenser 24, and having a slight integrating effect at the carrier frequency $f_s$, to the grid of an amplifying triode 25. The triode 25 is energised from a metal rectifier bridge 26 supplied with alternating current through a transformer 27; the positive lead 28 from the bridge 26 is connected to the anode of the triode 25 through load resistances 29 and 30, and the negative lead 31 from the bridge 26 is connected to the cathode of the triode 25 through a bias resistance 32 shunted by a by-pass condenser 33.

The triode 25 is resistance-capacity coupled to a second amplifying triode 41, the anode of the triode 25 being connected over a coupling condenser 42 to the grid of the triode 41, which grid is connected via a grid-leak resistance 43 to the negative lead 31. A small condenser 44, subsequently referred to, is inserted between the anodes of the triodes 25 and 41. The triode 41 is also energised from the bridge 26; its anode is connected to the positive lead 28 through a load resistance 45 and the load resistance 29, and its cathode is connected to the negative lead 31 through a bias resistance 46 shunted by a by-pass condenser 47. The triodes 25 and 41 are shown as incorporated in a common envelope.

The triode 41 is resistance-capacity coupled to a tetrode 48. The anode of the triode 41 is connected over a coupling condenser 49 and one part of a resistance 50 to the control grid of the tetrode, the other part of the resistance 50 serving as a grid-leak resistance. The tetrode is energised from the bridge 26, its anode being connected to the positive lead 28 through a choke 51 and its cathode being connected to the negative lead 31 through a bias resistance 52 shunted by a by-pass condenser 53. The screen-grid of the tetrode is tied to the anode, providing triode operation.

The A. C. potential applied to the control grid of the tetrode represents the output from the amplifying triode pair and is denoted by $e_4$.

The A. C. output of the tetrode 48 is applied through a condenser 54 shunted by a high resistance 55, to one winding 61 of an electric motor 62, another winding of which, magnetically at right angles to the winding 61, is energised by a source 64 of alternating current of the same frequency $f_s$ as the A. C. source 8. The motor is arranged to position an indicating and recording arm 65 of an indicator and recorder 66, and to position the contact arm over the potentiometer resistance 6.

Assuming the system is at rest in a state of equilibrium, with a steady temperature applied to the resistance 1, there is a steady value of $q_3$, the value of $q_2$ is equal to $q_1$, the A. C. output $e_1$ of the Wheatstone bridge 2 is zero, the A. C. output $e_4$ from the triodes is zero, the A. C. current in the winding 61 of the motor is zero, and the motor, the indicating and recording arm 65, and the contact arm 7 are stationary. To each steady temperature applied to the resistance 1, there is a corresponding position of the contact arm 7 at which $q_1=q_2$, and a corresponding position of the indicating and recording arm 65, and the scales of the indicator and recorder 66 are calibrated accordingly. If the temperature changes from one steady value towards another steady value, an A. C. output $e_3$ of one phase or the opposite phase is yielded by the Wheatstone bridge 2. A corresponding A. C. output $e_4$ of one phase or the other phase is yielded by the triodes, and an A. C. current of one phase or the opposite phase flows in the winding 61. The relation between the phases of the A. C. supplies 8 and 64 is arranged to be such that the motor rotates under the influence of the currents in the two windings 61 and 63 in a direction to move the contact arm 7 over the resistance 6 towards the appropriate fresh position thereof at which $q_1=q_2$. Thus the indicator and recorder 63 tend continuously to indicate and record the temperature to which the resistance 1 is connected.

The control effect applied to the motor upon which its acceleration and speed depends is greater the greater the difference between $q_1$ and $q_2$.

The Wheatstone bridge output $e_3$ is amplified by the triodes for the purpose of increasing sensitivity, i. e. reducing, in order to ensure accurate indications by the indicator and recorder 66, the relative effect of mechanical resistances to movement of the motor and its associated moving parts. The amplification of the Wheatsone bridge output $e_3$ also increases the speed at which the motor, upon the occurrence of a change from a steady value in the temperature under measurement, commences to respond. The gain upon amplication by the triodes may be measured by the ratio of the amplitude of the A. C. output $e_4$ of the triode, which amplitude may be written $|e_4|$, to the amplitude of the input $e_3$ of the triode, which may be written $|e_3|$. Such gain varies with the frequency of the applied A. C. input.

Figure 2:
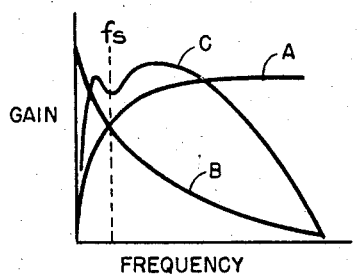
Figure 2 shows graphical curves explanatory of the operation of the system of Figure 1.

The variation with frequency of the gain $|e_4|/|e_3|$, of the resistance-capacity coupled pair of triodes without the described coupling by means of the condenser 44 may be shown graphically by a rising curve similar to the curve marked A in Figure 2, in which gain as ordinate is plotted against frequency as abscissa. By reason of the condenser 44 however there is a feedback in opposition from the output of the triode 41 to the input thereof, and to an extent which is greater the higher the frequency, and the gain-frequency characteristic of the triode 41 tends to assume a falling curve such as the curve marked B in Figure 2. The resultant curve of gain, $|e_4|/|e_3|$, against frequency will have a dip therein somewhat as shown in the curve C in Figure 2. The values of the electric quantities involved are chosen so that the dip occurs at the carrier frequency $f_s$.

Now the alternating input $e_3$ has a complex form, for it can be analysed into not only waves of the carrier frequency $f_s$ but, since the quantity $q_1-q_2$ is usually varying, into waves of other frequencies in addition, and it can be demonstrated that the effect of establishing the said dip in the gain-frequency curve C is that the control effect passed to the motor has not only a part varying with the difference between $q_1$ and $q_2$ but also a part varying with the rate of change of the difference between $q_1$ and $q_2$. It is known that when such a control effect is employed in a system of the kind described the sensitivity of the system can be increased without increasing the danger that the system will perform sustained oscillations at some natural frequency of oscillation.

In the system described, a desirable transfer characteristic is achieved with a minimum of additional components and the characteristic is obtained almost entirely by critical adjustment of the values of conventional components.

Figure 3:
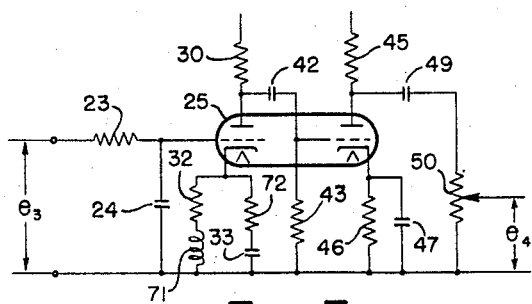
Figure 3 shows a modification of part of the system of Figure 1.

Figure 3 illustrates a modification of the amplifying and motor control unit 21 shown in Figure 1, in which instead of employing a condenser 44 connected between the anodes of the triodes 25 and 41 of the triode pair, a resonant circuit is connected in the cathode circuit of the first triode 25, so that it acts as a frequency selective feedback. In series with the bias resistance 32 is connected an inductance 71, and in series with the by-pass condenser 33 is a resistance 72, and the circuit of the inductance 71, resistances 32 and 72 and condenser 33 is tuned to pass least alternating current at the carrier frequence $f_s$, and so that a dip is produced at the carrier frequency in the curve between gain ($|e_4|/|e_3|$) and frequency.

Figure 4:
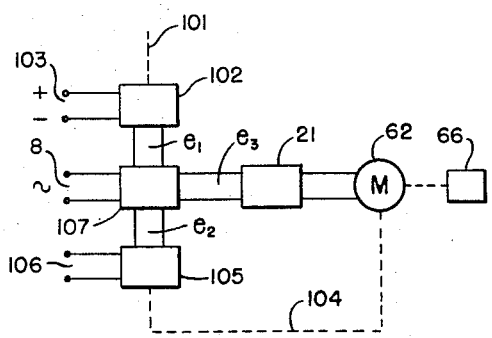
Figure 4 shows by block diagrams a system slightly different from that of Figure 1 and to which the invention is also applicable.

Figure 4 is a further diagram illustrating a system to which the invention is likewise applicable, in which a modulated carrier frequency is produced in a slightly different manner than in Figure 1. In Figure 4 a control condition, such as temperature or pressure which is to be measured, indicated and recorded, is shown at 101 as influencing a suitable device 102 so that the latter, which receives a D. C. supply 103, provides a control D. C. potential $e_1$, which is a measure of the control condition. The motor 62 is shown at 104 as influencing a suitable device 105 so that the latter, which receives a D. C. supply 106, provides a comparison D. C. potential $e_2$ varying with the position of the motor and with the indication of the indicator and recorder 66 positioned by the motor. The D. C. potentials $e_1$ and $e_2$ are compared in the device 107, which receives an A. C. carrier supply 8 and the difference between $e_1$ and $e_2$ is used to modulate the alternating current and produce a modulated carrier frequency output $e_3$ which is applied to the amplifier and motor control unit 21.

In a modification of the system of Figure 4, applicable in the case of temperature measurement by means of a thermo-couple, the thermo-couple can produce, without the use of a D. C. supply 103, a D. C. voltage $e_1$ for use in the device 107.

What is claimed is:

1. A thermionic servo amplifier system comprising network means responsive to the condition of a variable adapted to provide an unbalance A.-C. signal voltage variable in amplitude and reversible in phase in respect to an A.-C. energizing source, a two phase electric motor arranged to rebalance said network and having one phase winding energized from said source, an amplifier having at least two amplifying stages and having an input receiving said signal voltage and an output connected to energize the other phase of said motor, one of said amplifying stages including an electronic tube, a D.-C. source of potential for said tube, a coupling circuit interconnecting said stages effective to produce an output from the second stage having a rising frequency-gain characteristic curve, and means to produce a reverse feed-back effect through at least one of said stages to alone produce an output from said second stage having a falling frequency-gain characteristic curve whereby the resultant overall amplifier output has a frequency-gain characteristic curve with a substantial dip, said coupling circuit and said feed-back means being relatively adjusted to provide said dip substantially at the frequency of said source.

2. The system as defined in claim 1 wherein each of said amplifier stages comprises an electronic tube having an anode, a cathode and a grid, and said coupling circuit comprises an anode resistor and coupling capacitor connecting said stages in cascade.

3. The system defined in claim 1 wherein each of said stages comprises an electronic tube having an anode, a cathode and a grid, said coupling circuit comprises an anode resistor and coupling capacitor connecting said stages in cascade, and the feed-back means comprises a capacitor connected between the anode of the second stage tube and the input side of said coupling capacitor to provide said reverse feed-back for said second stage.

4. The system defined in claim 1 wherein said one stage comprises an electronic tube having an anode, a cathode and a grid, and a tuned circuit is provided between said cathode and said signal voltage source, said tuned circuit being tuned to act as a reverse feed-back frequency selective means to produce said dipping curve.

References Cited in the file of this patent

FOREIGN PATENTS 678,520    Great Britain _____ Sept. 3, 1952

OTHER REFERENCES

Electronic Instruments by Greenwood, Holdam and Macrae, McGraw-Hill Book Co., 1948, pages 80, 81, and 376.

UNITED STATES PATENT OFFICE
Certificate of Correction

January 20, 1959

Patent No. 2,870,393

Cyril Cryer Whitehead

It is hereby certified that error appears in the printed specification of the above numbered patent requiring correction and that the said Letters Patent should read as corrected below.

Column 1, line 27, for "a motor" read —the motor—; line 33, for "systems" read —system—; column 2, line 51, for "emplifier" read —amplifier—; column 3, line 30, for "value of $q_3$," read —value of $q_1$,—; line 31, for "output $e_1$" read —output $e_3$—.

Signed and sealed this 1st day of September 1959.

[SEAL]

Attest:
KARL H. AXLINE,
Attesting Officer.

ROBERT C. WATSON,
Commissioner of Patents.